Patented Mar. 20, 1928.

1,663,000

UNITED STATES PATENT OFFICE.

CHARLES HALLSTEAM CHANDLER, OF NEWPORT, RHODE ISLAND.

DECOLORIZING CARBON AND PROCESS OF MAKING SAME.

No Drawing.   Application filed June 18, 1920.   Serial No. 389,985.

The subject matter of the present invention relates to the utilization of a heretofore waste product for the manufacture of decolorizing carbons. I have discovered that the pith of the sugar cane which has heretofore been regarded as a waste product will upon suitable treatment yield a product of superior decolorizing and purifying powers which may be successfully substituted at a considerable saving for the expensive bone black now used in the refineries for the manufacture of refined sugar.

Roughly speaking sugar cane consists of a hard outer rind and a mass of softer tissue in the interior interspersed with fibres, the fibres being more frequent about the periphery of the stalk. The function of this softer tissue or parenchyma is to store up the sacchariferous juice of the cane, its structure being such as to give it great absorptive powers. By softening this tissue and opening its pores and carbonizing and keeping it in said condition, that is with open pores, until ready for use as a decolorizing agent, I obtain a product of superior decolorizing and purifying powers which absorbs in its pores not only the colors, but also the gums, pectins, ash and odours of the liquid under treatment, and at the same time constitutes an excellent filtering medium.

I thus not only utilize a waste product, but achieve an economical cycle process for the manufacture of refined sugar in that the decolorizing product recovered from the cane pith may be used to decolorize and purify the original juice of the cane pith and other parts of the cane stalk, whereby the original juice may be directly manufactured into refined white sugar in one operation. In its broadest aspect, therefore, my invention comprehends not only the treatment of the cane pith for the recovery of a product of superior decolorizing and purifying powers, but a cycle process for the production of white refined sugar in one operation from the original juice of the cane pith.

The pith may be prepared in any of a variety of ways. The pith is separated from the fibre and other solid constituents preferably by directly shredding the cane which is then passed through any convenient form of drying apparatus by which the moisture is reduced to approximately a point below 10 percent. The mixture is then allowed to fall through another inclined tube or the like which contains an internal lining screen of definite mesh. During its descent through this tube a current of air is blown against the mixture whereby to separate the pith from the fibre and blow the finer pith through the screen so that the fibre emerges freed from the pith. A satisfactory and economical method consists in boiling the pith after extraction of its original juices, with a weak solution of lime whereby to soften the tissue and render its pores open. A characteristic solution has the strength of about one half to one and one half Baumé of lime, where there is a minute quantity of barium salts present. The surplus lime is then washed off with water and the charge is carbonized either in a wet or dry state to keep open the pores. Preferably the charring is carried out in an airfree apparatus in the presence of the volatile gases of the charge itself. The temperature of carbonization may be any convenient one above low red heat, depending upon the type of furnace used, etc. After cooling, the pith char is extracted with any suitable chemical as an acid adapted to remove any matter which may have gotten into the open pores and the charge is then washed to remove all traces of the cleansing acid and dried, giving resultant product in the form of a black, light powderiferous substance. A characteristic acid is commercial hydrochloric acid with a small proportion of nitric acid present. This process is attended by a vigorous oxidation reaction, which being the reverse of the reducing action in the charring process, produces an extremely potent carbon. However, any acid, or mixture of acid, having the requisite oxidizing and cleansing powers may be used.

The decolorizing agent thus recovered may be used in the treatment of any liquid or oil in need of purification or decolorization and is particularly adapted for use in the treatment of the original juices extracted from the pith and other parts of the cane stalk for the direct manufacture of such liquid into refined white sugar. Although such treatment may be carried out in a variety of methods and with a variety of apparatus, a convenient method of decolorizing and purifying a liquid with this carbon consists in first adding the carbon to the liquid thoroughly mixed and heated, and second in separating the carbon from the treated liquid to recover the carbon.

From the foregoing it will be evident that my discovery permits the manufacture of white refined sugar on a cycle basis thus effecting a considerable economy in that my discovery obviates the necessity of purchasing any bone black or other decolorizing carbon and instead recovers the decolorizing agent from the sugar cane itself. My invention could be readily adapted to beet sugar houses during their closed season. The desiccated cane could be received and treated for the recovery of the decolorizing agent and the treated pith could be used in the purification of the beet juices during the slicing of the beets.

Aside from its use in the cycle process which I have described for the manufacture of refined sugar, the treated pith could also be used in place of bone black or in conjunction therewith in existing refineries at a material saving in operating charges.

What I therefore claim and desire to secure by Letters Patent is:

1. The process of obtaining a decolorizing carbon from the pith of sugar cane which consists in separating the pith from the other parts of the cane, in softening the pith, in carbonizing the softened pith and in extracting the resultant pith char.

2. The process of obtaining a decolorizing carbon from the pith of sugar cane which consists in separating the pith from the other parts of the cane, in boiling the pith in a solution of lime and water to soften it, in expelling the excess moisture from the softened pith, in carbonizing the softened pith, in chemically extracting the resultant pith char, in washing the charge to eliminate trace of the chemical extracting agent, and in finally drying the product.

3. A decolorizing carbon consisting of the carbonized isolated pith of sugar cane from which the sugar has been extracted.

4. Process which consists in extracting the sugar content of sugar cane, thereafter separating the pith and carbonizing it.

In testimony whereof I affix my signature.

CHARLES HALLSTEAM CHANDLER.